Devices for Coupling and Uncoupling Thills.

No. 158,607. Patented Jan. 12, 1875.

Witnesses
R. D. Ingersoll.
L. H. Ingersoll.

Inventor
Frank P. Stowe
By Ingersoll & Crury.
His Attys

UNITED STATES PATENT OFFICE.

FRANK P. STONE, OF CHICAGO, ILLINOIS.

IMPROVEMENT IN DEVICES FOR COUPLING AND UNCOUPLING THILLS.

Specification forming part of Letters Patent No. 158,607, dated January 12, 1875; application filed June 20, 1874.

*To all whom it may concern:*

Be it known that I, FRANK P. STONE, of Chicago, in the county of Cook and State of Illinois, have invented new and useful Improvements in Shaft-Clamps; and I do hereby declare the following to be a full, clear, and exact description of the same, which will enable others skilled in the art to which my invention relates to make and use the same, reference being had to the accompanying drawing forming part of this specification, in which—

Figure 1:
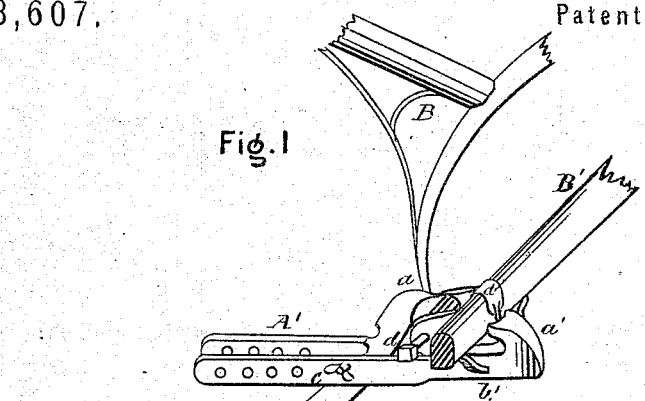
Figure 2:
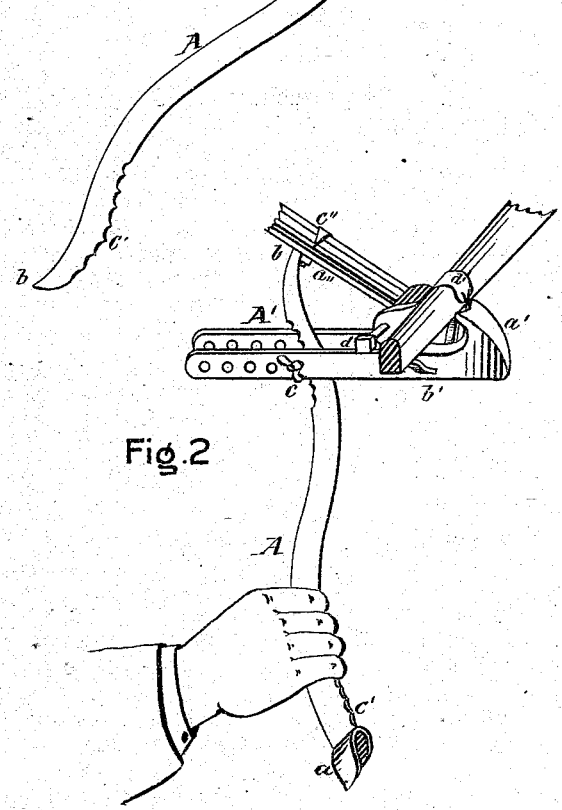

Figure 1, perspective view, showing position when attaching or detaching tongue. Fig. 2, perspective, showing position while attaching or detaching shafts.

The object of my invention is to construct a device for attaching or detaching the shafts or tongues of vehicles.

At the present time a rubber spring is placed in between the clip and the shaft-iron to prevent the noise and wear on the bolt.

In placing the shafts or tongue in position, or removing them, they are liable to get marked or bruised by the resistance of the rubber against the iron while forcing the same into position to receive the bolt.

In the accompanying drawing, A represents the lever, of wood or metal, one end having claws $a$, and the opposite end being flattened, as represented at $b$. The back of the lever near each end has notches $c'$. A' is a slotted shank, having upon one end the claw-hook $a'$ and the arms $b'$, the slotted end being provided with holes for passing the bolt $c$ through. B, cross-bar to a tongue having eye attached, by means of which one side is secured to the vehicle, and also showing the relative positions of the lever, the hook, and the tongue when attaching or detaching the tongue of a vehicle; B', axle, showing the position of the clip $d'$, to which the tongue or shafts are secured; $c''$, section of one shaft, showing the relative positions of the lever and the hook, the axle and the shaft, when attaching or detaching same; $d$, bolt passing through the eyes of the clip, and through the eye of the tongue or shaft, securing them to the vehicle.

The operation of my invention is as follows: When a tongue is to be attached or detached, the claws of the hook $a'$ engage with the clip $d'$, and the arms $b'$ rest upon the under side of the axle B'. The end of the lever having the claws engages the eye of the tongue. The lever is then forced back, and the bolt $e$ is passed through the holes in the shank A', which forms the fulcrum. When the strain is put upon the lever the notches $c'$ receive the bolt $c$, and prevent the same from moving. When used for shafts, the opposite end of the lever is passed through the slot in the shank A', and engages the nut $a''$ and the lever forced back, the same as before.

Having thus described my invention, what I claim as new, and desire to secure by Letters Patent, is—

The combination of the lever A, having claws $a$, notches $c'$, and the shank A' having hook $a'$ and arms $b'$ for attaching or detaching the tongue or shafts of vehicles, substantially as specified.

The above specification signed by me this 15th day of June, 1874.

FRANK P. STONE.

Witnesses:
R. D. INGERSOLL,
C. W. CRARY.